C. F. HUNTOON.
SIDE BEARING CAR TRUCK.
APPLICATION FILED MAY 26, 1915.
1,176,063. Patented Mar. 21, 1916.
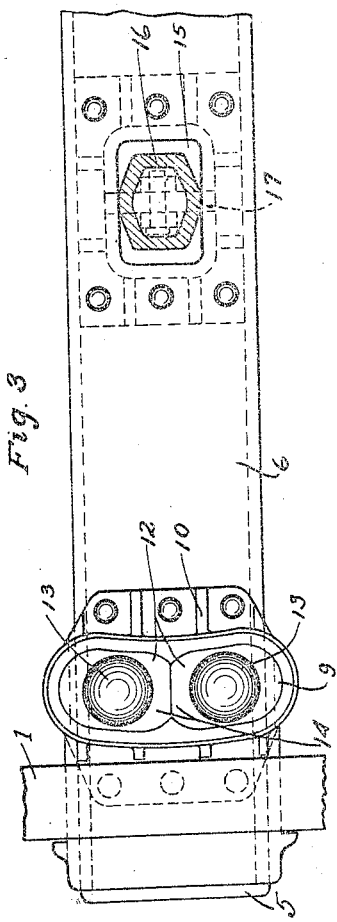
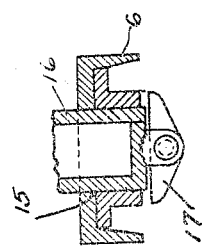
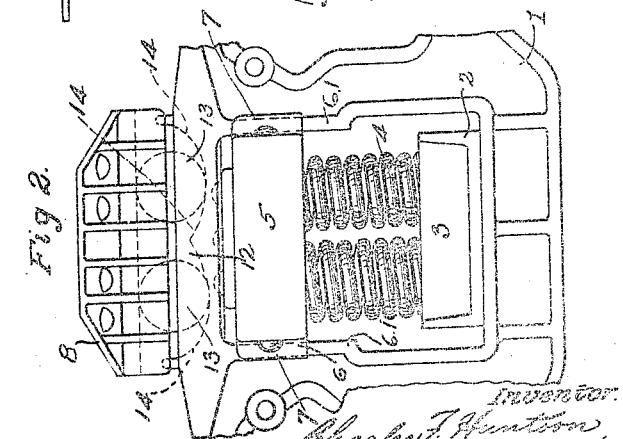

UNITED STATES PATENT OFFICE.

CHARLES F. HUNTOON, OF CHICAGO, ILLINOIS, ASSIGNOR TO HENRY D. LAUGHLIN, OF CHICAGO, ILLINOIS.

SIDE-BEARING CAR-TRUCK.

1,176,063.  Specification of Letters Patent.  Patented Mar. 21, 1916.

Application filed May 26, 1915. Serial No. 30,541.

*To all whom it may concern:*

Be it known that I, CHARLES F. HUNTOON, a citizen of the United States of America, and a resident of Chicago, county of Cook, and State of Illinois, have invented certain new and useful Improvements in Side-Bearing Car-Trucks, of which the following is a specification.

The main objects of this invention are to provide an improved and economical construction for railway car trucks wherein the load is supported by side bearings located substantially over the wheels of the truck, and whereby they will allow, and at the same time cushion, a lateral movement of the car body relative to the truck in addition to free pivotal movement and self centering of the truck relative to the car body; and to provide an improved connection between the truck and body bolsters adapted to permit said lateral and pivotal movements.

An illustrative embodiment of this invention is shown in the accompanying drawings, in which:

Figure 1 is a sectional elevation of a portion of the car truck showing one of the side bearings and the connection of the bolsters. Fig. 2 is an end view of the same. Fig. 3 is a plan of the same with the body bolster removed. Fig. 4 is a transverse sectional detail of the bolster connection.

In the construction shown in the drawings, the car truck comprises the usual side frames 1, upon which the journals (not shown) are supported. A channel-shaped spring plank 2 extends from one to the other of the side frames 1, being supported thereon at its ends, and has blocks 3 set therein upon which the usual cushion springs 4 are supported. Spring caps 5 secured to the truck bolster 6 rest upon the springs 4 and support the bolster 6 on the frames 1.

The bolster 6 is here shown to be of channel-shaped cross-section, and is provided with shoulders 7 embracing the frame flanges 6.1 for guiding the bolster in its vertical movement relative to the frames 1 and at the same time preventing longitudinal movement. A car or body bolster 8 is supported on the truck bolster 6 by means of the side bearings 9, and is connected to the truck bolster 6 intermediate of its ends so as to permit of a relative shifting of the bolsters, sidewise with respect to the car body, in addition to the the usual pivotal movement.

The side bearings 9 comprise lower members 10 secured to the truck bolster 6 and upper members 11 secured to the body bolster 8. The members 10 and 11 have ball races 12 formed in the opposed faces thereof within which the balls 13 are confined.

The ball races 12 are concentric with respect to the pivotal connection of the bolsters, and their transverse radius of curvature is greater than that of the balls 13 so as to present inclined surfaces to the balls 13 when there is a lateral or sidewise shifting of the bolsters. The inclined surfaces tend to retard movement of the balls, and thus cushion the end thrust caused by the relative lateral movement of the bolsters due to the centrifugal force when the car is rounding curves. In the line of travel the ball races in the lower members 10 are inclined upwardly at their ends, as at 14, (Fig. 2) so that when the car is rounding the curves there is a tendency for the body to be elevated slightly which reacts as the car returns to the straight track and tends to center the balls in the ball races, and to center the truck with respect to the body.

In the upper members 11 the ball race is of uniform elevation or horizontal from end to end and is open-ended, as shown in Fig. 2, so that if for any reason the limit of travel provided by the ball races in the lower members is exceeded, the upper member can slip over the balls without danger of injury thereto or to any part of the construction.

The center connection of the bolsters, as herein shown, comprises a socket 15 formed in the truck bolster 6 and a stud or pin 16 carried by the body bolster 8 and seated in said socket. The socket 15 is of rectangular contour, having the long dimension transverse to the car. The pin 16 is elliptical or polygonal in cross-section with the minor or shorter dimension substantially equal to the narrower dimension of the socket 15, and with the major or greater dimension considerably less than the corresponding dimension of said socket. In the specific construction herein shown, the pin is somewhat polygonal in shape, its front and rear sides being concentric with the axis of rotation at the middle for a distance sufficient for the desired range of angular movement of the truck, and then being extended in tangential directions to meet the ends, the corners being rounded. This form of stud and socket permits the desired lateral play, and at the same time determines the extreme limits of angular movement of the truck.

The pin 16 carries a key 17 whereby the bolsters are prevented from being separated.

By this construction the car body is lifted when the truck turns, and the weight of the car coacts with the inclined bottom races of the side-bearings to tend to return the balls and the truck to their normal positions, similarly lateral shifting of the truck with respect to the car is permitted but is cushioned by the inclined sides of the ball races and said inclined sides tend to return the truck to its normal position. An unusual amount of angular movement of the truck may occur without injury to the side bearings, by reason of the open-ended horizontal top races, but a dangerous degree of angular rotation of the truck is prevented by the polygonal center pin. As the weight of the car is all carried by the side bearings, the bolsters may be of comparatively light construction rendering the design an economical one.

Although but one specific embodiment of this invention has been herein shown and described, it will be understood that numerous details of the construction shown may be altered or omitted without departing from the spirit of this invention as defined by the following claims.

I claim:

1. In a car truck, the combination of truck and body bolsters connected together so as to permit relative sidewise and pivotal movements, side bearings comprising upper and lower members, said members having ball races formed in the opposed faces thereof and concentric to the pivotal axis of said bolsters, and balls located in said races, both members of each of said bearings having ball races concave transversely to the direction of travel of the car, such concavity being of flatter curvature than that of the periphery of the balls, whereby the weight of the car will resist the relative sidewise movement of the bolsters and normally urge the same to a central position, the ball races in said lower members being also concave in the line of travel of said balls and the ball races in said upper members being of uniform elevation from end to end in the line of travel of said balls.

2. In a car truck, the combination of truck and body bolsters connected together so as to permit relative sidewise and pivotal movements, side bearings comprising upper and lower members, said members having ball races formed in the opposed faces thereof and concentric to the pivotal axis of said bolsters, and balls located in said races, one member of each of said bearings having its ball race concave transversely to the direction of travel, such concavity being of flatter curvature than that of the periphery of the balls, whereby the weight of the car will resist the relative sidewise movement of the bolsters and normally urge the same to a central position, the connection of said bolsters comprising a socket on one of said bolsters, and a pin rigid on the other said bolster and seated in said socket, said pin being shaped to substantially fit said socket in the direction of the length of the car and having considerable clearance in a transverse direction.

3. In a car truck, the combination of truck and body bolsters connected together so as to permit relative sidewise and pivotal movements, side bearings comprising upper and lower members, said members having ball races formed in the opposed faces thereof and concentric to the pivotal axis of said bolsters, and balls located in said races, one member of each of said bearings having its ball race concave transversely to the direction of travel, such concavity being of flatter curvature than that of the periphery of the balls, whereby the weight of the car will resist the relative sidewise movement of the bolsters and normally urge the same to a central position, the connection of said bolsters comprising a socket on one of said bolsters, and a pin rigid on the other said bolster and seated in said socket, said pin being shaped to substantially fit said socket in the direction of the length of the car and having considerable clearance in a transverse direction, and said pin having shoulders positioned to engage the walls of the socket and limit the angular movement of the truck.

Signed at Chicago this 22nd day of May, 1915.

CHARLES F. HUNTOON.

It is hereby certified that in Letters Patent No. 1,176,063, granted March 21, 1916, upon the application of Charles F. Huntoon, of Chicago, Illinois, for an improvement in "Side-Bearing Car-Trucks," an error appears in the printed specification requiring correction as follows: Page 2, line 47, claim 1, before the word "ball" insert the word *their;* and that the said Letters Patent should be read with this correction therein that the same may conform to the record of the case in the Patent Office.

Signed and sealed this 9th day of May, A. D., 1916.

[SEAL.]

Cl. 105—115.

R. F. WHITEHEAD,
*Acting Commissioner of Patents.*